Figure 1:
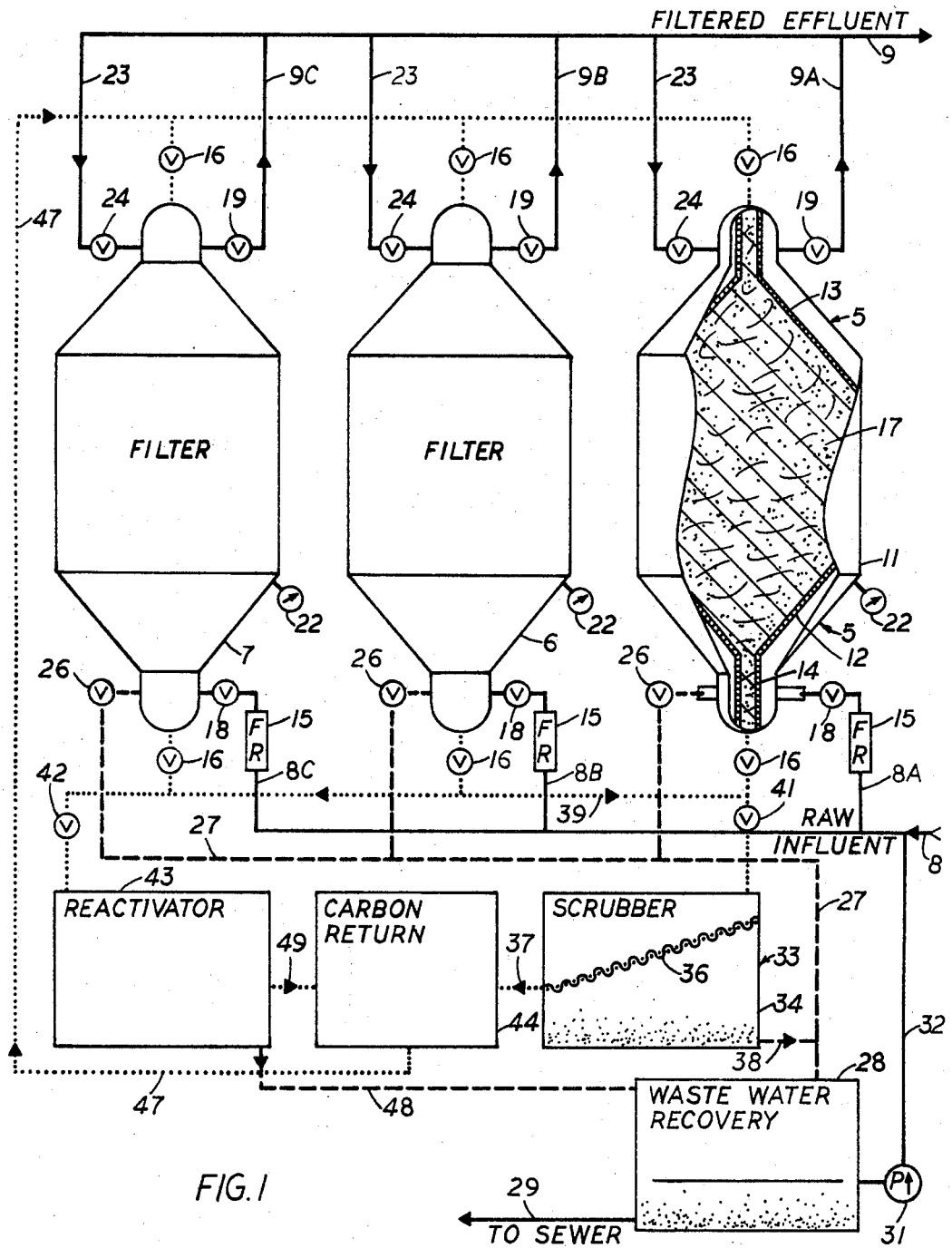

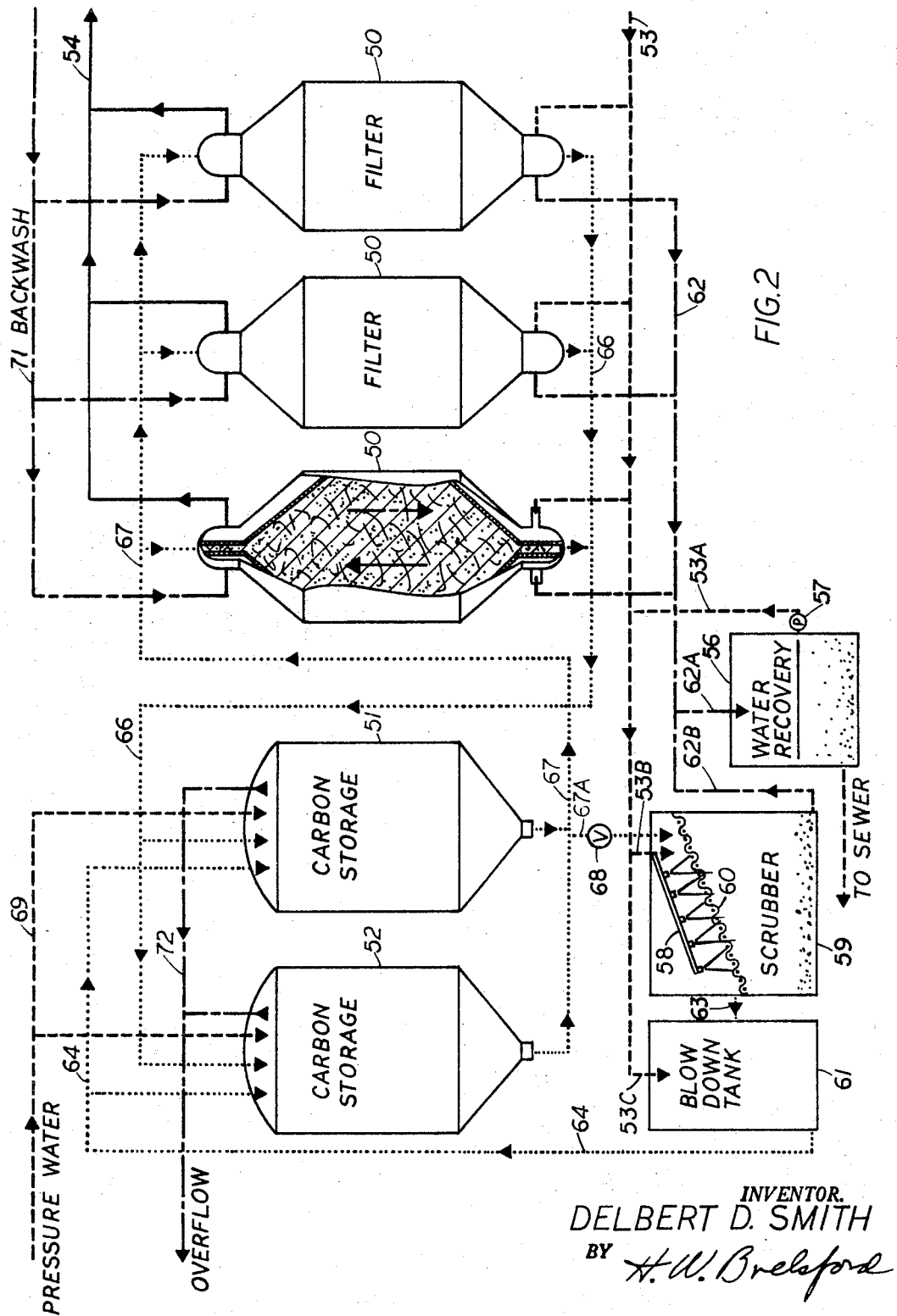

United States Patent Office 3,436,343
Patented Apr. 1, 1969

3,436,343
SIMULTANEOUS FILTERING FOR REMOVAL OF TASTE, ODOR AND TURBIDITY
Delbert D. Smith, Santa Barbara, Calif., assignor to Aqua Filter, Inc., Santa Barbara, Calif., a corporation of California
Filed Dec. 17, 1963, Ser. No. 331,298
Int. Cl. B01d 15/06, 15/00; C02c 5/02
U.S. Cl. 210—32                           2 Claims This invention relates to the filtering of water and has particular reference to a filtering medium and mode of operation that permits simultaneous filtering through a single medium to remove adverse taste, odor and turbidity.

The invention is particularly applicable to the dryer portions of the United States, and elsewhere, which utilize storage reservoirs to retain rainfall during years of abundant rainfall to supply municipal or domestic water during years of low or marginal rainfall. Such reservoirs are characterized by long periods of small intake, great bacterial action and rapid algae growth. These conditions produce adverse taste, odor and turbidity in the water, often to the point that the water is not potable. Such water must be treated to remove these objectionable characteristics before it can be used in municipal water supplies. Various types of chemical, aeration, poisioning, and agitation treatments have been tried with varying degrees of success. The present invention is based on the discovery of a single filtering step or action that successfully removes the water constituents giving rise to these unfavorable characteristics and producing a clear, sparkling, taste free water that is eminently acceptable for domestic water supply. The invention further utilizes high pressure and high flow types of equipment making practical its use in any part of a water supply pressure system without the necessity of pumps to repressurize the treated water as when open sand bed filters are used. Multiple filters in accordance with the invention may be connected in parallel to handle any desired quantative water flow.

The problems of taste, odor and turbidity arise from complex chemical-organic actions taking place under a variety of different conditions. Algae cause several problems of taste and turbidity, and poisioning the surface of reservoir water with copper compounds is frequently used to control this growth. Depletion of algae removes a source of dissolved oxygen in the water, and the low remaining oxygen is consumed by aerobic bacteria, killing off fish life. This condition is accentuated by thermal stratification that prevents mixing. Water completely devoid of oxygen tends to concentrate in the lower water levels giving rise to anaerobic bacterial action which produces hydrogen sulphides and other sulphides. Bacterial slimes and bottom sediments add to the taste and odor problem. Over chlorination creates not only objectionable chlorine odor and taste but tends to fix musty types of odors. The use of tunnels to deliver reservoir water to the consumer adds additional taste and odors, especially when tunnel slimes develop and when hot mineral waters are encountered in the rock with attendant sulphur compounds.

The taste-odor-turbidity problems of such reservoirs are therefore of complex constitution and have resulted in the many sided efforts mentioned previously to solve these problems. Invariably, it has been felt necessary to remove turbidity before treatment for taste and odor. The turbid constituents generally have clogged the activated charcoal diatomaceous earth, and other treatment mediums employed for taste and odor. Generally, a flocculation has been employed by treating the water with lime and various additives, which coagulates turbidity constituents in the resulting "floc" which settles out. The remaining water has then been filtered in rapid sand filters. Frequently, powered activated carbon is added to the water following flocculation for control of taste and odor and after allowing a minimum contact time of several hours, the rapid sand filter has been employed to remove this powdered carbon.

It is a general object of this invention to provide a method of filtering, whereby a single filtering medium simultaneously removes taste, odor and turbidity.

Another object is to provide a filtering method employing high pressure, high flow and short contact time.

A further object is to provide a filtering method having a backwash step, wherein a carbon filtering element medium is backwashed in place.

A further object of the invention is the use of a specialized type of activated carbon in a pressurized filter of the confined medium type.

Another object of the invention is the provision of a filtering method that employs commercially available high-pressure and high-flow filter units.

Still another object of the invention is a filtering method employing a fluid flow for a special scrubbing action for filtering medium outside the filter pressure vessel.

Other objects, features and advantages of the invention will be apparent in the following description and claims, considered together with the accompanying drawings, in which:

FIG. 1 is a flow diagram of a simplified modification of a filtering method embodying the invention; and FIG. 2 is a flow diagram of a presently preferred commercial embodiment of the filtering system of the invention.

Referring to FIG. 1, there is illustrated a plurality of filter elements 5, 6 and 7, each of which may be similarly constructed and raw water is introduced to these filter elements through a line 8 and filtered water flows from these filter elements through a line 9. Any number of filter elements 5, 6 and 7 may be employed, depending upon the size of the filter elements and the volume of water to be filtered and the average amount of material to be removed by filtering. The three illustrated, therefore, are merely representative of any plurality of filter elements.

Referring to filter element 5, it will be noted that the element has an external shell 11 and two conical screens 12 and 13, one at each end. A tube 14 connects the interior of retaining screens of each filtering element to a carbon removal valve 16. Contained by the two screens 12 and 13, is a mass of activated carbon 17 which in accordance with the invention should be graded, granular material. The material appears much like ground coffee, having a weight of about 30 pounds per cubic foot. It is presently preferred to use a granule size that will pass an eight-mesh screen and will not pass a 30-mesh screen. This filtering material, therefore, is confined within the conical screens 12 and 13 which are secured at their outer edges to the pressure vessel 11. Accordingly, water under full main pressure passes through the activated granular carbon 17.

It is a feature of the invention that apparatus is employed which is commercially available. The filtering elements 5, 6 and 7 are preferably of the same general construction shown for element 5, and these are commercially available being generally referred to as "filtering columns."

Raw water flows from the influent pipe 8 through branches 8A, 8B, and 8C through flow regulator valves 15 to control valves 18 which admit this water to the interior of the pressure vessel of each filtering element 5, 6 and 7. The water then flows through the conical screen 12, through the mass of activated carbon 17, and through the conical screen 13 to a valve 19, whereupon it flows through a conduit 9A to the effluent line 9. Similarly, influent line 8B passes water to the filter element 6, through a valve 18, and the filtered water passes through a valve 19 to the effluent line 9B to flow into effluent line 9. On filter element 7 the raw water flows through the branch line 8C through a valve 18, through the filter element, and the filtered water passes through the valve 19 to the branch line 9C into the effluent line 9.

Whenever the carbon becomes dirty with the turbid elements in the raw water, it is necessary to backwash the filter element in order to remove these dirt particles. While various tests may be performed to determine when the granular carbon 17 has become loaded with dirt so that it is no longer efficient, this is determined in accordance with the invention by the pressure drop through the mass of granulated carbon 17. This is done by measuring the internal pressure at the inlet end of each filter element 5, 6 and 7 by means of a gauge 22 at each filter element. Such a gauge measures the pressure drop through the activated carbon because of the fact that the flow regulator valves 15 passes a constant flow of water, regardless of how much pressure must be overcome. Accordingly, at the inlet end of each filter element 5, 6 and 7, the pressure is automatically increased because the flow regulator valve 15 admits a constant flow and in order to do so, a higher pressure must be exerted on the granular carbon 17 in order to maintain this constant flow. When the pressure necessary to overcome the dirty carbon exceeds the normal pressure drop about ten times, then the carbon 17 is dirty enough to be backwashed to restore its filtering capacity. For example, the inlet pressure on line 8 may be 100 pounds, and the effluent pressure on line 9 may be 80 pounds. A normal pressure drop through a clean bed of granular carbon 17 may be about 3 pounds. When the flow regulator 15 causes the pressure at the inlet end of the filter elements to indicate a 15-pound pressure loss, then the granular carbon 17 is backwashed. This then is a ratio of increase in pressure of about one to five, but one to ten is an acceptable limit, and in usual practice, it is presently preferred to use ratios from one to three up to one to five.

The backwashing of the filter elements 5, 6 and 7 is performed by first closing the inlet valve 18 and the outlet valve 19 for each filter element. Filtered water is used as the backwash liquid and this is obtained through a backwash line 23 leading from the effluent line 9 through a valve 24 admitting this backwash water into the upper ends of each filter element 5, 6 and 7. It will be recognized by those skilled in the art that this valving function could be performed by the outlet valve 19, but more positive control can be obtained by using the separate valve 24. At the lower end of each filter element a backwash valve 26 is opened permitting water to flow from the interior of the lower end of each filter element 5, 6 and 7 to a backwash water line 27 which leads to a waste water recovery tank 28. In that tank may be placed suitable screening and other equipment to settle out the heavier solids and the concentrated dirt is flowed to a sewer through a line 29, and the clean recovery water is pumped by a pump 31 through a line 32 to the influent line 8 so that it, in turn, may be filtered and utilized rather than have it wasted. The flow of backwash water is continued until all the backwash water is clear as it passes out of the filter element and this may be determined by suitable visual or electronic, or other tests.

The backwashing of the granular carbon 17 substantially restores the filtering capacity of the carbon and the filter element that has been backwashed may then again be placed into the filtering line by closing the backwash valves 24 and 26 and opening the filter valves 18 and 19 for each filter element. It will be noted, however, with each backwash that the carbon is not completely restored to the filtering capacity of new clean carbon. When the pressure gauge 22 indicates that backwashing has not restored the granular carbon to an acceptable filtering capacity, then it is necessary to scrub the carbon.

While some types of scrubbing may be performed inside of a filtering column or filtering element, it is preferred to scrub the carbon outside of the pressure shell of the filter element, inasmuch as this results in a much more thorough operation. While such carbon could be removed mechanically or manually, or otherwise, it is removed in accordance with the present invention by fluid flow or hydraulic flow to a scrubber. Such a scrubber is shown diagrammatically at 33 and may include a tank 34 having an inclined screen 36 over which granular carbon flows to an outlet 37. While over the screen the carbon is subjected to high pressure sprays of hot water and other scrubbing liquids generally of an aqueous nature so that these may be recovered also. For this purpose an outlet pipe 38 is connected to the backwash water line 27 so that this scrubbing liquid may be delivered to the waste water recovery tank 28. Scrubbers for carbon and other filtering media are well known in the industry and accordingly, the disclosure of the scrubber 34 is diagrammatic only and represents any type of scrubber suitable for this purpose. The carbon to be scrubbed is hydraulically delivered to the scrubber 33 by opening each carbon flow valve 16 on each filter element 5, 6 and 7, and closing the raw water inlet valve 18. Either valves 19 or 24 may be opened to give a source of hydraulic fluid under pressure, and the carbon thereupon flows with the water stream through the valves 16 into a carbon flow line 39. A valve 41 in this line is opened so that the carbon may flow into the scrubber 33. Another valve 42 (to the left in FIG. 1) is closed so that no carbon flows to a reactivator unit 43. After the carbon is scrubbed in the scrubber 33 and the dirt particles removed that have been adhering to each carbon granule, the scrubbed carbon is delivered to the carbon return tank 44. This carbon may be returned from this tank to each filter element 5, 6 and 7 by means of pressurizing tank 44, delivering the mixture of carbon and water into a return line 47 leading to the top of each filter element 5, 6 and 7. The valves 16 are opened at the top of each filter element 5, 6 and 7, and the valves 16 are closed at the bottom of each filter element. The carbon, accordingly, flows into the interior of the filter elements being restrained by the lower screen 12, the upper screen 13, and the pressure wall 11 of the filter element.

After the carbon has been in use as a filtering element for a period of time, it loses its ability to remove taste and odor. The carbon must thereupon be reactivated. It is not practical to reactivate carbon inside the filter column in the present state of the art, and accordingly, separate reactivators are preferred. In accordance with the invention, the carbon from each filter element is removed from the filter element to the reactivator by hydraulic or fluid flow. Referring still to FIG. 1, valve 41 in the carbon flow line 39 may be closed and the valve 42 opened, thereupon hydraulic flow of the carbon is commenced as just described with respect to the scrubber 33. The carbon is then delivered to the reactivator 43, whereupon it is reactivated. The transport water for this carbon may be salvaged by a line 48 leading from the reactivator 43 to the waste water recovery tank 28.

Reactivators are well known in the art, and accordingly, no type of structure is shown in FIG. 1. The rectangle 43 represents any suitable type of reactivator and the retort type of reactivator is presently preferred, wherein the carbon is heated to a high temperature in a controlled oxygen atmosphere in order to remove all of the adsorbed vapors, liquids and solids. The reactivated carbon may be delivered by a conduit 49 to the carbon return tank 44, and may be delivered to the filter elements 5, 6 and 7 in the manner previously described with respect to the scrubbed carbon. As mentioned previously, only one of several filter elements needs to be out of filtering action for the treatment of the carbon. In a typical operation, the filters are backwashed several times a week, and the backwash period is usually not more than 20 minutes. Scrubbing of the granular carbon takes place only once in 3 to 6 months and hot water and acid are frequently all that is required. The reactivation of the carbon seldom takes place more than one to three years. Under these time schedules, periods of low water use can be selected for backwashing the filter element and for scrubbing the granular carbon filtering medium. As will be described more fully with respect to FIG. 2, scrubbed carbon may be held in reserve in an amount sufficient to completely fill one filter element so that the filter element itself is out of filtering operation only 30 minutes, whereas the scrubbing operation itself may take 4 to 8 hours. As shown in FIG. 1, the apparatus may be so operated so that there is a continuous scrubbing of the granular carbon as discharged from one filter element while scrubbed clean carbon may be flowed into the upper end of the same filter unit. Alternatively, the return tank 44 may be large enough so that enough carbon can be held at any one time to allow any one filter element to be completely emptied of its granular carbon for scrubbing.

As mentioned previously, this invention incorporates the use of a special type of activated carbon as the filter medium, namely, carbon made from bituminous coal. This type of carbon has been known and widely used for various types of purification applications, but it has been discovered that this type of filtering medium is so superior for the removal of taste and odors that an entirely new order of performance is encountered. For example, unpotable reservoir water was treated with powdered activated carbon and the result was entirely unacceptable. Next a different base material of powdered activated carbon was employed, but it too failed to remove the objectionable taste and odor. The use of bituminous coal base granular activated carbon, however, eliminated taste and odor to an acceptable degree. Further, this type of carbon has superior filtering capability for the removal of turbidity in that a pre-filtration is not needed. Previously, it has been necessary to filter turbid water with other types of filters before subjecting it to contact with activated carbon. This has been found not to be necessary and this bituminous coal activated carbon has routinely and regularly removed turbidity up to 16 parts per million, cleaning the turbid water till turbidity is reduced to approximately 2 parts per million. When turbidity exceeds 16 parts per million, some preliminary treatment is desirable but not necessary and pre-filtration is not required.

Although the exact action of this bituminous coal carbon is not known, it is believed that the ash content of this carbon contributes to its unique filtering and adsorption capability. This may be due to chemical reaction with turbidity and taste and odor constituents of the water, or may be due to an ion exchange type of mechanism. In a typical commercially available bituminous coal carbon that performed satisfactorily in accordance with the invention, there was a total ash of 7.6%, water soluble ash of .06%, acid soluble ash of .92%, total sulphur of .8%, and sulphide sulphur of .02%. The following table shows the constitutents of this ash, and the solubility of this ash in water, and in acid. The acid employed was a 3% solution of hydrochloric or sulphuric acid.

|  | Percent |
|---|---|
| Total ash | 7.6 |
| Water soluble ash | 0.06 |
| Acid soluble ash | 0.92 |
| Total sulfur | 0.8 |
| Sulfide sulfur | 0.02 |

| Constituent | Percent of total ash | Percent of water soluble ash | Percent of acid soluble ash HCl or $H_2SO_4$ |
|---|---|---|---|
| $SiO_2$ | 48.19 chem | 35.0 spec | 15.0 spec |
| $Al_2O_3$ | 31.06 chem | 7.5 spec | 20.0 spec |
| $Fe_2O_3$ | 13.30 chem | 0.79 chem | 29.02 chem |
| CaO | 2.67 chem | 8.31 chem | 4.62 chem |
| MgO | 0.97 chem | 2.5 spec | 1.50 spec |
| $TiO_2$ | 1.77 chem | | 3.0 spec |
| $Na_2O$ | 0.85 chem | 25.0 spec | 3.0 spec |
| $K_2O$ | 0.74 chem | 0.75 spec | 0.10 spec |
| $SO_3$ (combustible S) | 0.096 chem | | |

The following compounds represented 1/10 of 1%, or less, of the ash, as determined by Spectro Chemical Analysis: $Li_2O$, $B_2O_3$, $MoO_3$, $V_2O_5$, NiO, CoO, PbO, MnO, SrO, $Cr_2O_3$, CuO, $SnO_2$.

The ash constituents would appear to be important from a chemical reaction standpoint, or ion exchange standpoint. As I mentioned previously, the presently preferred granule size for use with the invention is a granule that will pass 8-mesh but will not pass 30-mesh. The bituminous type of carbon completely removes detergents, many types of pesticides, weed-killing and brush-killing chemicals which are frequently collected in a watershed or reservoir. Chlorine, of course, is completely removed by the filtering operation, and accordingly, no pre-chlorination is needed. The resultant effluent has a very low chlorine demand, and chlorine, accordingly, is added to the water after it is filtered.

Referring now to FIG. 2, there is illustrated a type of presently preferred commercial installation, but for purposes of simplicity, valves are omitted that were shown in FIG. 1. The interior construction of the filter elements may be substantially the same as shown in FIG. 1, and accordingly, that showing is not repeated. FIG. 2 shows an installation utilizing three filter elements 50, and two carbon storage tanks 51 and 52. The number and size of tanks can be varied according to the number and size of the filter elements, and the total filtering capacity desired, and accordingly, these are illustrated only insofar as the number of units are concerned. Raw water is supplied by an influent line 53 and filtered water is removed by an effluent line 54. Suitable branches from these lines lead to all of the filter elements 50. The influent line 53 also has a branch 53A connected to a waste water recovery tank 56 having a pump 57 to deliver cleaned water to this influent line. Another branch 53B delivers water to a plurality of nozzles 58 disposed within a carbon washer 59 wherein carbon flows down an inclined screen 60. Another branch 53C leads to a blow down tank 61 where cleaned carbon is received before it is delivered back to the carbon storage tanks 51 or 52. A backwash water line 62 has branches leading to each filter element 50, and a branch 62A leading to the waste water recovery tank 56 and another branch 62B leading from the carbon scrubber 59.

The apparatus of FIG. 2 employs the carbon storage tanks 51 and 52 to provide clean carbon for the filters 50. Accordingly, a line 63 delivers scrubbed carbon from the scrubber 59 to the blow down tank 61. Leading from the blow down tank 61 is a carbon flow line 64 leading to the top of both storage tanks 51 and 52. By proper valving (not shown), the scrubbed carbon can be delivered to either tank 51 or tank 52. Therefore, at any one time, either tank 51 or tank 52 may be filled with cleaned, scrubbed carbon.

The other tanks 51 and 52 may be utilized to hold dirty carbon prior to its scrubbing in the scrubber 59. Connected to the bottom of each filter element 50 is a dirty carbon line 66 that leads to the top of storage tanks 51 and 52. By proper valving (not shown) the dirty carbon may be deposited in either tank 51 or 52. Connected to the bottom of each storage tank 51 and 52 is a carbon delivery line 67 leading to the top of each filter element 50. This carbon delivery line also has a branch 67A controlled by a valve 68 which delivers dirty carbon to the carbon washer or scrubber 59. The storage tanks 51 and 52 may be provided with a water pressure line 69 for flowing the carbon from the bottom of these tanks. The top of the filter elements 50 may be connected to a backwash line 71 for delivering treated backwash water to these filter elements.

The backwash operation of the apparatus 52 is similar to that of FIG. 1, and the backwash water is collected in the waste recovery tank 56 and part of it salvaged by the pump 57, and the extremely dirty water is delivered to the sewer. The scrubbing operation of the apparatus 52 is entirely different from FIG. 1. The particular filter element 50 whose carbon is to be scrubbed is connected to the carbon flow line 66 and the carbon is delivered to either tank 51 or 52, whichever is empty. The tanks 51 and 52 have enough capacity to hold all of the carbon present in any one filter 50. When the particular filter is empty of carbon, this flow through line 57 is turned off, and the other tank 51 or 52 pressurized by the line 69, and scrubbed clean carbon is flowed through the line 67 to the top of the particular filter element 50, whereupon it flows into the filter. When the filter is full, it is restored to regular filtering operation, which means a flow from influent line 53 to effluent line 54. The dirty carbon in tank 51 or 52 is then flowed into the carbon scrubber 59 and the scrubbed clean carbon is delivered to either tank 51 or 52 whichever is empty. This flow through line 64 is pressurized by the branch 53C from the influent line 53. Each tank 51 and 52 is connected to an over-flow line 72 so that an over abundance of water may be disposed of when the carbon is being transported.

From the foregoing operation of FIG. 2, it will be apparent that the carbon filtering material in any one filter 50 may be quickly removed for scrubbing by flowing it to a storage tank. As soon as it is empty, the filter may be recharged with scrubbed clean carbon very quickly from the other storage tank 51 or 52. The time that any filter element 50 is off of the filtering line is therefore reduced to a matter of a very few minutes. This permits scrubbing the carbon in the scrubber as the optimum rate of scrubbing takes place only once every several months in a normal operation. It will be appreciated by those skilled in the art that carbon which must be reactivated can be similarly removed from the filter elements and temporarily held in storage for delivery to a reactivator which is not shown in FIG. 2.

While the invention has been described with reference to two particular types of apparatus, it will be appreciated by those skilled in the art, that various modifications and variations of apparatus and methods of operating may be made without departing from the true spirit and scope of the invention. For example, compressed air flow of the carbon is another type of fluid flow. Various system pressures may be utilized to eliminate pumps in the apparatus. Back flowing may be accomplished while the carbon is outside of the filter column. Scrubbing might take place in the filter column. For these and various other reasons, the described apparatus is merely illustrative of the invention and not limiting. The invention, accordingly, is not limited to the specific disclosure, but embraces all concepts contained in the following claims.

What is claimed is:

1. The method of operating a plurality of water filter elements having pressure vessels containing granulated carbon to obtain continuous filtering of water under pressure without interruption of filtering flow comprising:
    (a) confining a mass of activated carbon in the pressure vessels;
    (b) flowing raw water through at least one of said filter elements;
    (c) indicating the pressure drop across each filter element;
    (d) stopping flow through any one of said filter elements wherein the pressure drop exceeds a preselected value;
    (e) backwashing in place with clean water any such filter element indicating excessive pressure drop until the backwash water is clear;
    (f) restoring raw water flow through the backwashed filter elements;
    (g) hydraulically flowing to a scrubber the granular carbon of any filter element wherein backwashing fails to restore the pressure drop to that of clean carbon;
    (h) scrubbing said hydraulically flowed carbon and hydraulically returning it to the filter element;
    (i) restoring raw water flow through the filter element having scrubbed carbon;
    (j) testing the filtered water for taste and odor removal;
    (k) hydraulically flowing to a reactivator the granular carbon of any filter which has lost its ability to substantially remove taste and odor;
    (l) reactivating said carbon to restore its ability to remove taste and odor;
    (m) hydraulically returning the reactivated carbon to the filter element; and
    (n) restoring raw water flow through the filter element having the reactivated carbon.

2. The method of operating a plurality of water filter elements employing a granular activated filtering material to obtain continuous filtering of water under pressure for removal of taste, odor and turbidity without interruption of filtering flow comprising:
    (a) flowing raw water through at least one of said filter elements;
    (b) stopping flow through any filter element whose carbon has become dirty while maintaining flow through at least one other said filter element;
    (c) backwashing in place said any filter element whose filtering material has become dirty and whose filtering flow has been stopped;
    (d) restoring filtering flow through said filtering element having backwashed filter material;
    (e) shutting off filtering flow through any filter elements when backwashing fails to remove accumulated dirt;
    (f) scrubbing the filtering material of any filter element wherein backwashing fails to remove cumulated dirt;
    (g) restoring filtering flow through any filter having scrubbed filtering material;
    (h) indicating the pressure drop across filter elements during filter flow to indicate when the carbon has become dirty and when back washing fails to remove accumulated dirt;
    (i) testing the filtered water for taste and odor; and
    (j) reactivating the filtering material of any filter element wherein the material has lost the ability to remove taste and odor.

References Cited

UNITED STATES PATENTS

| | | | |
|---|---|---|---|
| 805,374 | 11/1905 | McDonald | 210—252 |
| 2,055,755 | 9/1936 | Stuart | 252—421 |
| 2,339,742 | 1/1944 | Fuchs | 252—421 |
| 2,635,755 | 4/1953 | Griswold | 210—39 |
| 2,858,024 | 10/1958 | Babcocks | 210—108 |
| 2,809,938 | 10/1957 | Goren et al. | 252—444 X |
| 3,194,683 | 7/1965 | Grosvenor et al. | 210—189 X |
| 47,308 | 4/1865 | Jasper | 210—32 |
| 538,720 | 5/1895 | Allen | 210—264 |
| 938,778 | 11/1909 | Morrison | 210—277 |
| 1,788,510 | 1/1931 | Everson | 210—277 X |
| 2,059,552 | 11/1936 | Churchill | 210—277 X |
| 2,572,082 | 10/1951 | Welsh | 210—33 |
| 2,763,580 | 9/1956 | Zabor | 127—55 |
| 3,184,397 | 5/1965 | Work et al. | 252—444 |

FOREIGN PATENTS

| | | |
|---|---|---|
| 580,013 | 8/1946 | Great Britain. |
| 1,292,979 | 4/1962 | France. |

OTHER REFERENCES

Hassler, Active Carbon, The Modern Purifier, copyright 1941, Industrial Chemical Sales Division. West Virginia Paper & Pulp Co. Copy in Scientific Library, TP–245–C4–H3 1941, pp. 5–8 and 29–33 relied on.

REUBEN FRIEDMAN, *Primary Examiner.*

FRANKS A. SPEAR, JR., *Assistant Examiner.*

U.S. Cl. X.R.

210—33, 34, 35, 39, 90, 189, 253, 264